(12) United States Patent
Murata

(10) Patent No.: US 6,192,775 B1
(45) Date of Patent: Feb. 27, 2001

(54) LINK CONNECTING ROD FOR WIPER APPARATUS

(75) Inventor: Yukiho Murata, Yokohama (JP)

(73) Assignee: Jidosha Denki Kogyo Kabushiki Kaisha, Kanagawa Prefecture (JP)

( * ) Notice: Subject to any disclaimer, the term of this patent is extended or adjusted under 35 U.S.C. 154(b) by 0 days.

(21) Appl. No.: 09/296,664

(22) Filed: Apr. 22, 1999

(30) Foreign Application Priority Data

Apr. 23, 1998 (JP) .................................................. 10-113706

(51) Int. Cl.$^7$ ................................. B60S 1/08; F16B 21/00
(52) U.S. Cl. ........................ 74/588; 74/579 R; 15/250.31
(58) Field of Search ................................. 74/588, 579 R; 29/888.09, 888.092; 15/250.31, 250.34, 250.351, 250.352

(56) References Cited

U.S. PATENT DOCUMENTS 5,165,306 * 11/1992 Hellon ..................................... 74/588
5,313,697 * 5/1994 Kanno et al. ....................... 74/579 R

FOREIGN PATENT DOCUMENTS 2 165 912 * 4/1986 (GB) .
61-91378 * 5/1986 (JP) .
4-334643 * 11/1992 (JP) .

* cited by examiner

Primary Examiner—David A. Bucci
Assistant Examiner—William C Joyce
(74) Attorney, Agent, or Firm—Sughrue, Mion, Zinn, Macpeak & Seas, PLLC

(57) ABSTRACT

A link connecting rod for wiper apparatus is provided with a tubular rod body, a plate portion with a first and a second plane flattened by compressing an end of the rod body, a semicylindrical portion with a third plane having a semicircular cross section and disposed between the rod body and the plate portion, a first brim portion with a fourth and a fifth plane flattened by compressing one side of the semicylindrical portion and a second brim portion with a sixth and a seventh plane flattened by compressing another side of the semicylindrical portion. The plate portion, the semicylindrical portion, the first and second brim portions are formed by pressing the end of the rod body on the base level of the second, the third, the fifth and seventh planes which are all in one plane.

12 Claims, 7 Drawing Sheets

LINK CONNECTING ROD FOR WIPER APPARATUS

BACKGROUND OF THE INVENTION

1. Field of the Invention

This invention relates to a link connecting rod to be used for transmitting the power of the wiper motor to the pivot shaft in the wiper apparatus mounted on motor vehicles.

2. Description of the Prior Art

There has been known a link connecting rod provided with plate portions 51 formed flatwise by compressing respective ends of a tubular body 50 as shown in FIG. 10, as a conventional link connecting rod used for transmitting the power of the wiper motor to the pivot shaft of the wiper apparatus. The plate portions 51 are fitted respectively with ball retainers of the ball joints, one of the ball retainers is connected with a ball pin secured to a motor arm fixed to the output shaft of the wiper motor through a spherical pair, and another ball retainer is connected with a ball pin secured to a pivot arm fixed to the pivot shaft through a spherical pair, whereby the rotational power of the wiper motor is converted into reciprocative rotation of the pivot arm.

However, in the aforementioned conventional link connecting rod, the center $0_1$ of the plate portion 51, which is formed by compressing one end of the tubular body 51, is liable to deviate from the central axis $0_2$ of the tubular body 50, therefore the plate portion may be stressed at a position deviated from the central axis $0_2$ of the tubular body 50 and there is a problem in that it is not possible to sufficiently utilize the original strength of the tubular body 50 in a case where the large deviation comes out between the center $0_1$ of the plate portion 51 and the central axis $0_2$ of the tubular body 50. Furthermore, there is another problem in that it is difficult to obtain sufficient bending strength at a position between the plate portion 51 and the tubular body 50. In this case, although it is possible to improve the bending strength of the plate portion 51 by using a pipe with larger diameter as the tubular body 50, it is unfavorable in view of weight of the wiper apparatus.

SUMMARY OF THE INVENTION

Therefore, this invention is made in the light of the aforementioned problems of the prior art, it is an object to provide a link connecting rod for a wiper apparatus having sufficient strength even in a case of applying a smaller pipe in diameter to the tubular rod body.

The construction of the link connecting rod for the wiper apparatus according to this invention for accomplishing the above-mentioned object is characterized by comprising a tubular rod body having a ring-shaped cross section; a plate portion flattened by compressing an end of the tubular rod body, and having a first plane, a second plane on the reverse side of the first plane and a retainer hole to be formed with a ball retainer through insert moulding; a semicylindrical portion disposed in a position between the plate portion and the rod body, and having a hollow semicircular cross section and a third plane ranging with the second plane of the plate portion on the same plane; a first brim portion formed by compressing one side of the semicylindrical portion, and having a fourth plane and a fifth plane ranging with the third plane of the semicylindrical portion on the same plane on the reverse side of the fourth plane; and a second brim portion formed by compressing another side of the semicylindrical portion, and having a sixth plane and a seventh plane ranging with the third plane of the semicylindrical portion on the same plane on the reverse side of the sixth plane.

The link connecting rod according to a preferred embodiment of this invention is characterized in that the first and second brim portions are disposed away from the plate portion at a predetermined distance.

The link connecting rod for the wiper apparatus according to another preferred embodiment of this invention is characterized by further comprising a arched portion ranging from a position between the first plane of the plate portion and the fourth plane of the first brim portion to a position between the first plane of the plate portion and the sixth plane of the second brim portion.

The link connecting rod for the wiper apparatus according to the other embodiment of this invention is characterized in that the third plane of the semicylindrical portion is formed with a concavity. Furthermore, the link connecting rod according to the other embodiment of this invention is characterized in that the center of the plate portion is in agreement with the central axis of the rod body.

In the link connecting rod for the wiper apparatus according to this invention, which is provided with the semicylindrical portion having the semicircular cross section and the brim portions on the both sides of the semicylindrical portion, and so formed that the second plane of the plate portion, the third plane of the semicylindrical portion, the fifth and seventh planes of the first and second brim portions may be on the same one plane. Accordingly, it is hard to deviate the center of the plate portion from the central axis of the rod body at the time of forming the plate portion by pressing the end of the rod body flatwise, so that the strength of the link connecting rod is improved even if a small pipe in the diameter is applied to the rod body.

DESCRIPTION OF THE PREFERRED EMBODIMENT

Figure 1:
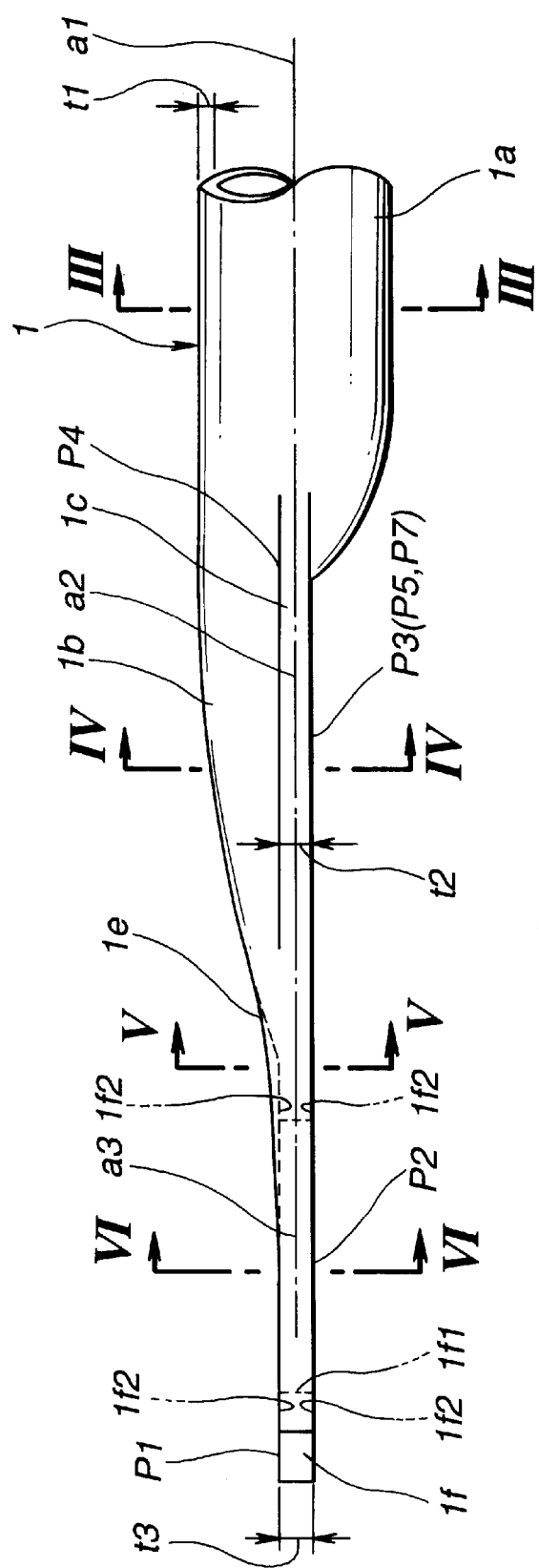
FIG. 1 is an enlarged front view illustrating an end of the link connecting rod for the wiper apparatus according to an embodiment of this invention.

An embodiment of the link connecting rod for the wiper apparatus according to this invention will be described below on basis of FIGS. 1 to 9.

The link connecting rod 1 has a tubular rod body 1a made of a metallic pipe, and provided with a semicylindrical portion 1b, first and second brim portions 1c and 1d, an arched portion 1e, and a plate portion 1f at one end of the rod body 1a, and further provided with a semicylindrical portion 1g, first and second brim portions 1i and 1h, an arched portion 1j, and a plate portion 1k at another end of the rod body 1a.

The plate portion 1f at one end of the rod body 1a is formed with a first ball retainer 2 of a first ball joint, and the plate portion 1k at the other end of the rod body 1a is also formed with a second ball retainer 3 of the second ball joint.

In the link connecting rod 1 according to this embodiment, the semicylindrical portions 1b and 1g, the first brim portions 1c and 1i, the second brim portions 1d and 1h, the arched portions 1e and 1j, and the plate portions 1f and 1k are disposed symmetrically with each other at the both ends of the rod body 1a and formed in the same shapes, respectively. Therefore, the semicylindrical portion 1b, the first and second brim portions 1c and 1d, the arched portion 1e and the plate portion 1f formed at the one end of the rod body 1a will be mainly described in detail on basis of FIGS. 1 to 6, and the explanation will be omitted with respect to the semicylindrical portion 1g, the brim portions 1i and 1h, the arched portion 1j, and the plate portion 1k formed at the opposite end of the rod body 1a.

Figure 3:
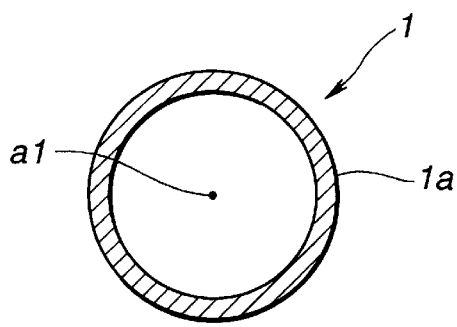
FIG. 3 is a transverse cross section taken along the plane of line III—III of FIG. 1.

The rod body 1a, which forms a center part of the link connecting rod 1, has a tubular body with a ring-shaped cross section as shown in FIG. 3, a wall thickness of t1 and the central axis a1 as shown in FIG. 1. Further, the link connecting rod 1 is continuously formed with the semicylindrical portions 1b and 1g at the respective ends of the rod body 1a and further provided with the plate portions 1f and 1k at the extreme ends of the semicylindrical portions 1b and 1g. The plate portion 1f (also the plate portion 1k) has a first plane P1 and a second plane P2 on the reverse side of the first plane P1.

Figure 4:
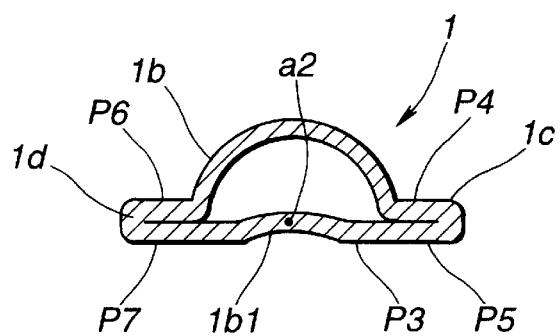
FIG. 4 is a transverse cross section taken along the plane of line IV—IV of FIG. 1.

The semicylindrical portion 1b has a hollow semicircular cross section as shown in FIG. 4 and a third plane P3 on the lower side in FIGS. 1 and 4. The third plane P3 ranges with the second plane P2 of the plate portion 1f on the same plane in parallel to the center axis a1 of the rod body 1a and is formed with a concavity 1b1 partially depressed in the center thereof.

Figure 2:
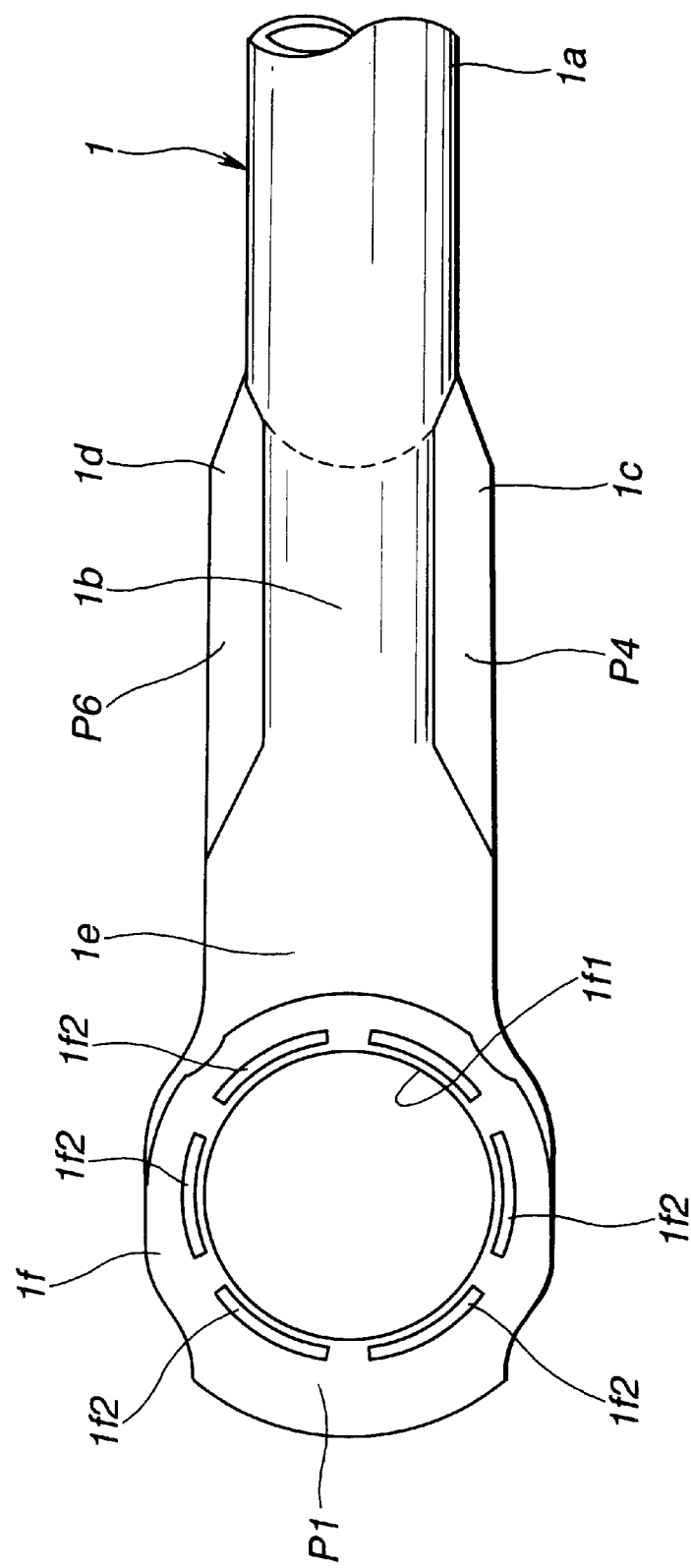
FIG. 2 is a top view of the link connecting rod shown in FIG. 1.
Figure 9:
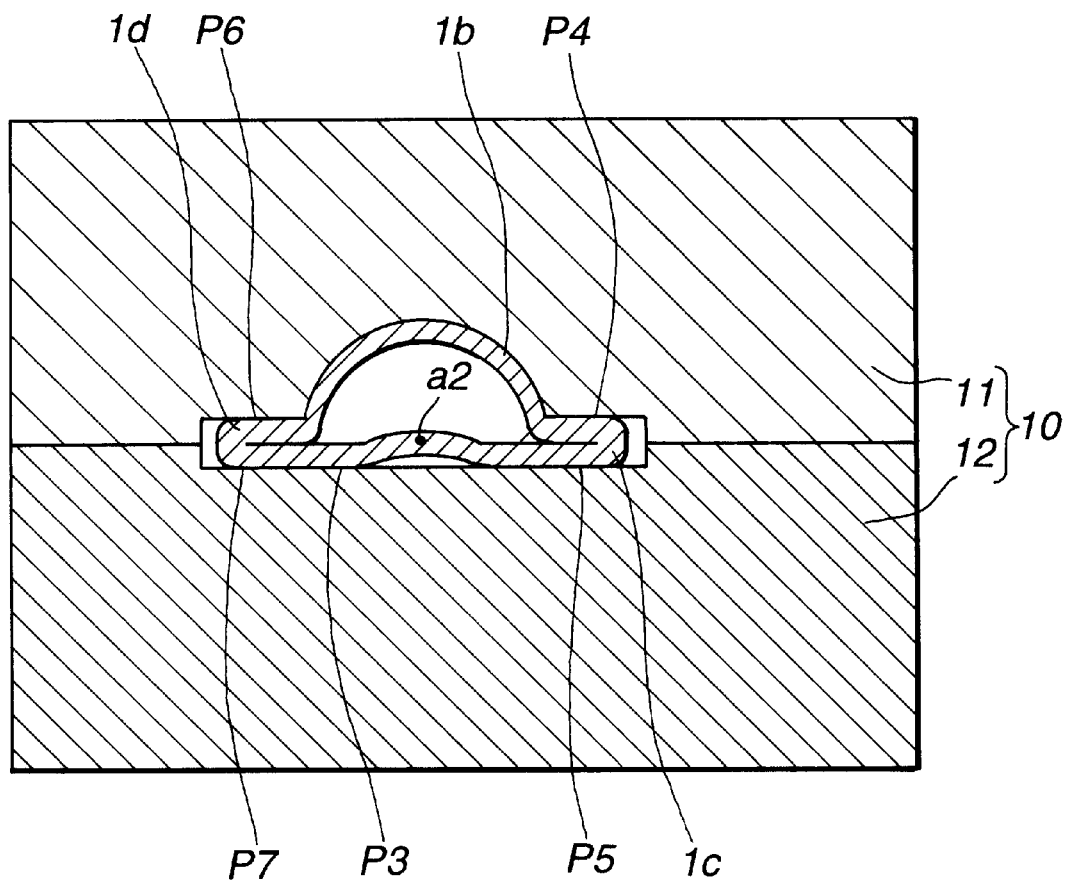
FIG. 9 is a cross sectional view of press dies illustrating the press forming of the link connecting rod according to this invention at the semicylindrical portion.
Figure 10:
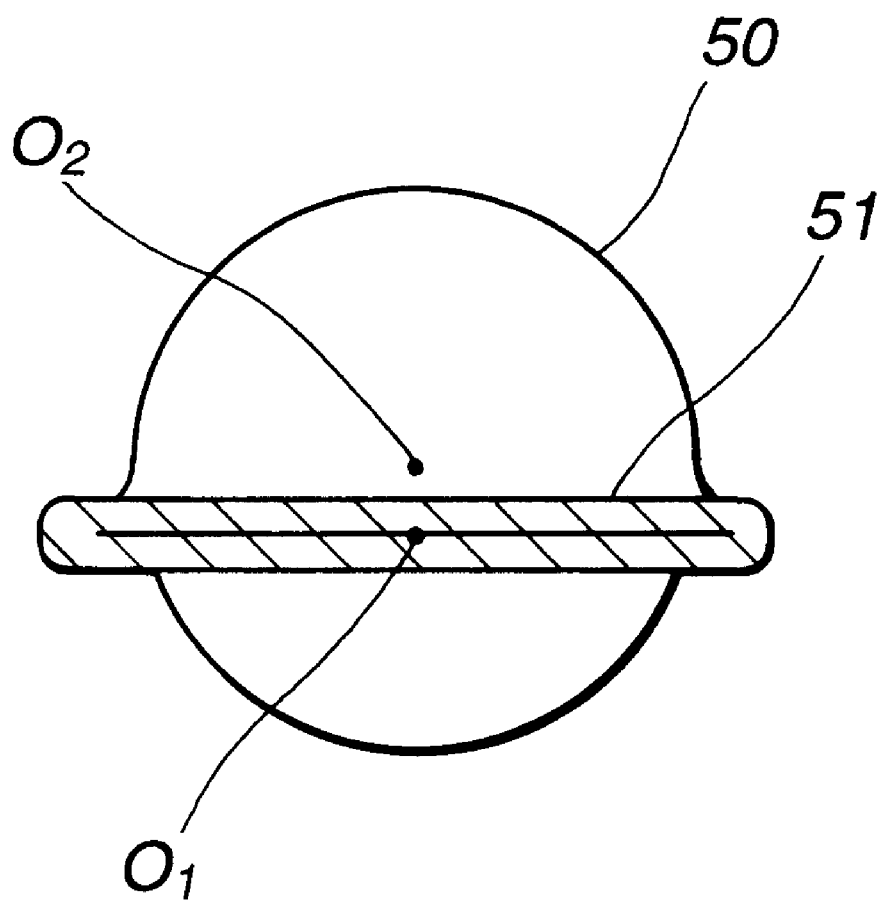
FIG. 10 is a transverse cross section of the conventional link connecting rod for the wiper apparatus at the plate portion.

The semicylindrical portion 1b is formed with the first and second brim portions 1c and 1d on the both sides thereof as shown in FIGS. 1, 2 and 4 by compressing the respective sides thereof using a press dies 10 composed of an upper die 11 having a semicircular die cavity and a lower die 12 having a flat-shaped die cavity as shown in FIG. 9. The first and second brim portions 1c and 1d are disposed in a pair in the longitudinal direction of the semicylindrical portion 1b, the first brim portion 1c has a fourth plane P4 on the upper face in FIGS. 1 and 4, and a fifth plane P5 ranging with the third plane P3 of the semicylindrical portion 1b on the same plane on the reverse side of the fourth plane P4. The second brim portion 1c has a sixth plane P6 on the upper face in FIG. 4, and a seventh plane P7 ranging with the third plane P3 of the semicylindrical portion 1b on the same plane on the reverse side of the sixth plane P6. Accordingly, the second plane P2 of the plate portion 1f, the third plane P3 of the semicylindrical portion 1b, the fifth plane P5 of the first brim portion 1c and the seventh plane P7 of the second brim portion 1d range with each other on the continuous same plane as shown in FIG. 1, and the semicylindrical portion 1b, the first and second brim portions 1c, 1d and the plate portion f are formed by pressing on the same base level, that is the planes P3, P5, P7 and P2.

The first and second brim portions 1c and 1d are respectively formed in thickness of t2 larger than the wall thickness t1 of the rod body 1a as shown in FIG. 1. The link connecting rod 1 is improved in the rigidity at the semicylindrical portion 1b by forming the first and second brim portions 1c and 1d.

Furthermore, as shown in FIG. 1, the center line a2 of the semicylindrical portion 1b easily coincides with the central axis a1 of the rod body 1a by press-forming the first and second brim portions 1c and 1d on the both sides of the semicylindrical portion 1b on the fifth and seventh planes P5, P7 ranging with the third plane P3 of the semicylindrical portion 1b as the base level as shown in FIG. 9.

The semicylindrical portion 1b is further formed continuously with the arched portion 1e at an end on the side of the plate portion 1f. The arched portion 1e is a portion remaining in an unflattened state, is disposed in a boundary between the first and second brim portions 1c, 1d and the plate portion 1f and sited in a range from the position between the first plane P1 of the plate portion 1f and the forth plane P4 of the first brim portion 1c toward the position between the first plane P1 and the sixth plane P6 of the second brim portion 1d.

Figure 5:
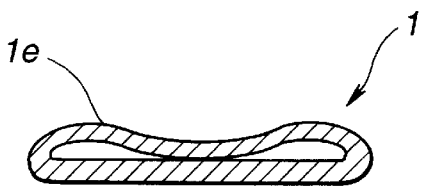
FIG. 5 is a transverse cross section taken along the plane of line V—V of FIG. 1.

The arched portion 1e which has a cross section as shown in FIG. 5, is formed by pressing without completely flattening the end of the semicylindrical portion 1b and works to improve the bending strength at the position between the semicylindrical portion 1b and the plate portion 1f. Therefore, the bending strength of the link connecting rod 1 is secured even if the plate portion 1f has a wide area, so that it becomes possible to use the metallic pipe with a small diameter as the material for the link connecting rod 1.

The link connecting rod 1 is formed continuously with the plate portion 1f at the extreme end of the semicylindrical portion 1b by pressing and flattening the extreme end of the material pipe. The plate portion 1f is formed in an approximately circular shaped with a retainer hole 1f1 in the center thereof, and further formed with six grooves 1f2 for forming the ball retainer 2 around the retainer hole 1f1 on the respective faces thereof (first and second planes P1 and P2).

Figure 6:
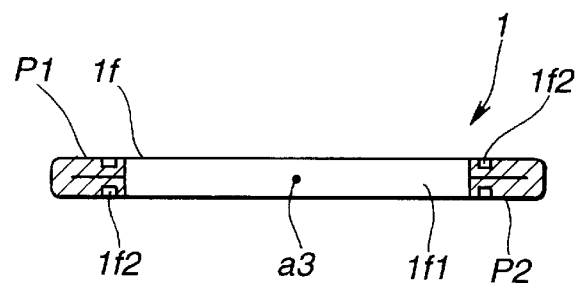
FIG. 6 is a transverse cross section taken along the plane of line VI—VI of FIG. 1.
Figure 7:
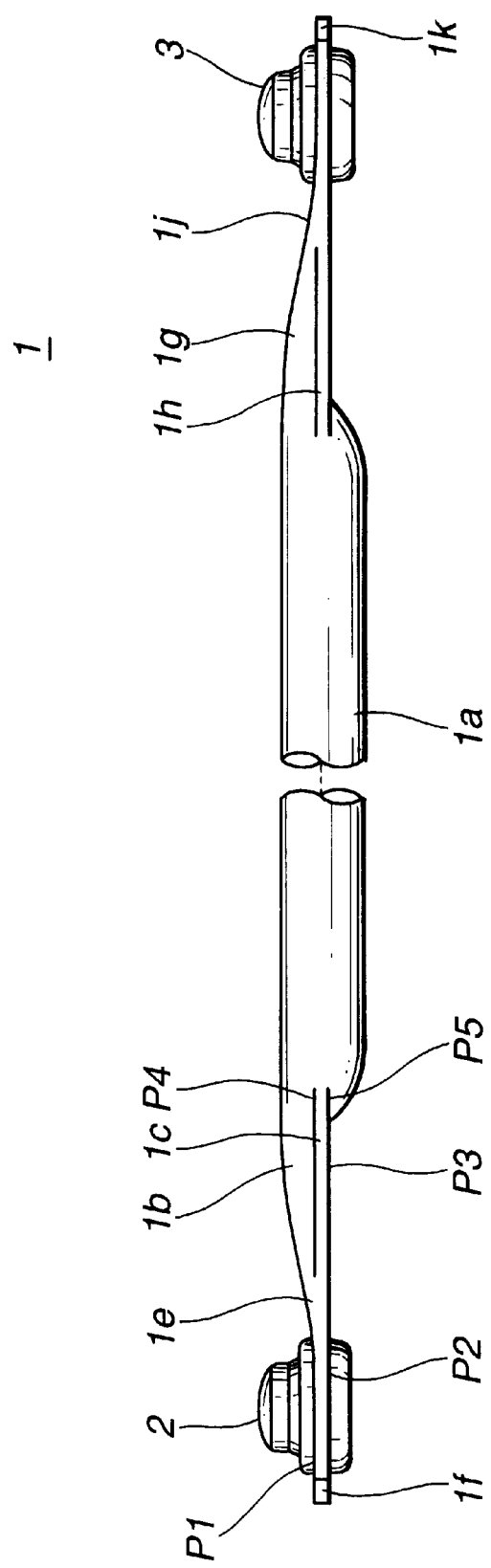
FIG. 7 is a front view illustrating the whole body of the link connecting rod shown in FIG. 1.
Figure 8:
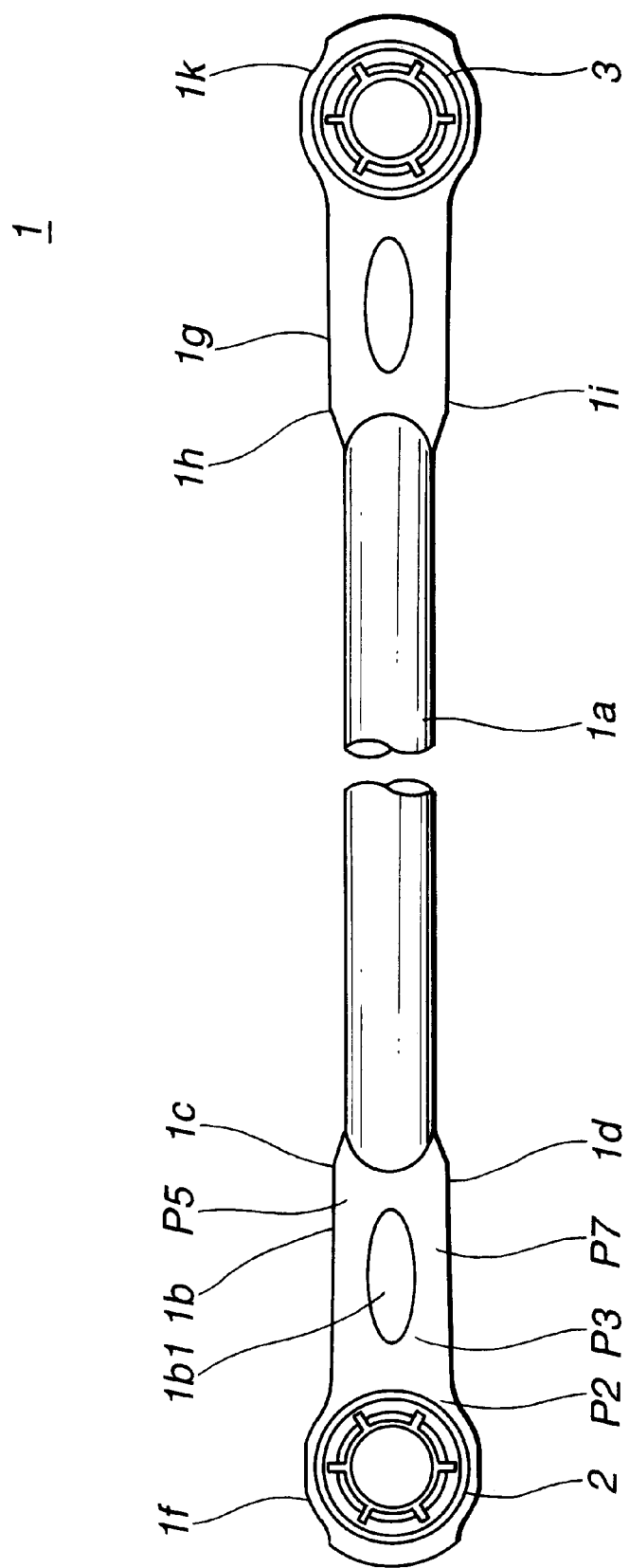
FIG. 8 is a bottom view of the link connecting rod shown in FIG. 7.

The plate portion 1f has a cross section as shown in FIG. 6 and the first and second planes P1 and P2 as mentioned above, and the second plane P2 continues from the third plane P3 of the semicylindrical portion 1b on the same plane, therefore the plate potion 1f is press-formed on the base plane of the second plane P2, the third plane P3, the fifth and seventh planes P5 and P7 which are all in one plane. Accordingly, the center line a3 of the plate portion f1 coincides with the center line a2 in the semicylindrical portion 1b and the center lines a3, a2 and the central axis a1 of the rod body a1 lie on one straight line as shown in FIG. 1. The plate portion 1f is formed in a thickness of t3 approximately equal to the thickness t2 at the first and second brim portions 1c and 1d.

In the retainer hole 1f1 of the plate portion 1f, the first ball retainer 2 of the fist ball joint is formed using the grooves 1f2 through insert moulding process. In this time, the ball retainer 2 is formed on the second plane P2 of the plate portion 1f as a base plane, therefore a straight line connecting the centers of the first ball retainer 2 and the second ball retainer 3 formed at the opposite end of the rod body 1a agrees with the central axis a1 of the rod body 1a and there is not positional deviation between the first and second ball retainers 2 and 3. An area of the plate portion 1f is designed in accordance with an outer diameter of the ball retainer 2 to be moulded in the retainer hole 1f1.

In the link connecting rod 1 having the aforementioned structure, the tubular-shaped rod body 1a is manufactured from the material pipe, and the rod body 1a is subjected to the press working on the both ends thereof. According to the press working, the semicylindrical portion 1b with the arched portion 1e, the first and second brim portions 1c and 1d, and the plate portion 1f are formed on the base level of the third plane P3, the fifth and seventh planes P5 and P7, and the second plane P2 which are all in one plane. The semicylindrical portion 1g, the first and second brim portions 1i and 1h, and the plate portion 1k are also formed at the opposite end of the rod body 1a in the same manner as above.

Then, the insert moulding is performed by using resin on the plate portions 1f and 1k flattened through the pressing work, so that the first and second ball retainers 2 and 3 are formed respectively on the plate portions if and 1k.

The link connecting rod 1 manufactured through the above-mentioned process is applied to a part of the linkage of the wiper apparatus for the motor vehicle, the ball retainer 2 is connected to a first ball pin of the first ball joint secured to an end of the motor arm (not shown) through a spherical pair, and the second ball retainer 3 is connected to a second ball pin of the second ball joint secured to an end of a pivot arm (not shown). Whereby, the link connecting rod 1 converts the rotation of the wiper motor into reciprocative rotation of the pivot shaft through the motor arm and the pivot arm, and a wiper blade connected to the pivot shaft through the wiper arm swings reciprocatively according to the reciprocative rotation of the pivot shaft.

As mentioned above, in the link connecting rod 1 for the wiper apparatus according to this invention, the center line a2 at the semicylindrical portion 1b coincides with the central axis a1 of the rod body 1a by press-forming the semicylindrical portion 1b and the first and second brim portions 1c and 1d on the base level of the third plane P3 of the semicylindrical portion 1b, the fifth plane P5 of the first brim portion 1c and the seventh plane P7 of the second brim portion 1d which are all on the same one plane. Further, the center line a3 at the plate portion 1f also coincides with the center line a2 of the semicylindrical portion 1b by press-forming the plate portion 1f on the base level of the second plane P2 of the plate portion 1f which ranges with the third plane P3 of the semicylindrical portion 1b and the fifth and seventh planes P5 and P7 on the same plane. Consequently, the center line a3 of the plate portion 1f, the center line a2 of the semicylindrical portion 1b and the central axis a1 of the rod body 1a of the link connecting rod 1 lie on one straight line, and the link connecting rod 1 is remarkably improved in the strength, especially in the buckling strength at the time of applying compressive load thereon.

Furthermore, the semicylindrical portion 1b is disposed with the arched portion 1e independently from the first and second brim portions 1c, 1d at the position between the first plane P1 of the plate portion 1f and the fourth and sixth planes P4, P6 of the first and second brim portion 1c, 1d. Accordingly, it is possible to tolerate the bending stress applied to the position between the semicylindrical portion 1b and the plate portion 1f and it is not necessary to use the pipe with a large diameter as a material for the link connecting rod 1 even if the area of the plate portion 1f becomes larger.

What is claimed is:

1. A link connecting rod for a wiper apparatus comprising:
    a tubular rod body having a ring-shaped cross section;
    a plate portion flattened by compressing an end of said tubular rod body, and having a first plane, a second plane on the reverse side of said first plane and a retainer hole to be formed with a ball retainer through insert moulding;
    a semicylindrical portion disposed in a position between said plate portion and said rod body, and having a hollow semicircular cross section and a third plane ranging with the second plane of said plate portion on the same plane, said third plane being formed with a concavity;
    a first brim portion formed by compressing one side of said semicylindrical portion, and having a fourth plane and a fifth plane ranging with the third plane of said semicylindrical portion on the same plane on the reverse side of said fourth plane, said first brim portion being disposed away from said plate portion at a predetermined distance;
    a second brim portion formed by compressing another side of said semicylindrical portion, and having a sixth plane and a seventh plane ranging with the third plane of said semicylindrical portion on the same plane on the reverse side of said sixth plane, said second brim portion being disposed away from said plate portion at a predetermined distance; and
    an arched portion ranging from a position between the first plane of said plate portion and the fourth plane of said first brim portion to a position between said first plane of the plate portion and the sixth plane of said second brim portion.

2. A link connecting rod as set forth in claim 1, wherein the center of said plate portion is in agreement with the central axis of said rod body.

3. A link connecting rod for a wiper apparatus comprising:
    a tubular rod body having a ring-shaped cross section;
    a flattened main plate portion flattened by compressing an end of said tubular rod body, and having a first plane portion, a second plane portion on the reverse side of said first plane portion, and a retainer hole to be formed with a ball retainer through insert moulding;
    a semicylindrical portion disposed in a position between said plate portion and said rod body, and having a hollow semicircular cross section and a third plane portion ranging with the second plane portion of said plate portion on the same plane;
    a first brim portion formed by compressing one side of said semicylindrical portion, and having a fourth plane portion and a fifth plane portion ranging with the third plane portion of said semicylindrical portion on the same plane on the reverse side of said fourth plane portion, said first brim portion being disposed away from said main plate portion at a predetermined distance;
    a second brim portion formed by compressing another side of said semicylindrical portion, and having a sixth plane portion and a seventh plane portion ranging with the third plane portion of said semicylindrical portion on the same plane on the reverse side of said sixth plane portion, said second brim portion being disposed away from said main plate portion at a predetermined distance; and
    an arched portion with a first convex portion and a second convex portion, the first convex portion located between the first plane portion of said main plate portion and the fourth plane portion of said first brim portion and the second convex portion located between said first plane portion of the main plate portion and the sixth plane portion of said second brim portion.

4. A link connecting rod as set forth in claim 3, wherein said third plane portion of the semicylindrical portion is formed with a concavity.

5. A link connecting rod as set forth in claim 3, wherein the center of said main plate portion is in agreement with the central axis of said rod body.

6. A link connecting rod as set forth in claim 4, wherein the center of said main plate portion is in agreement with the central axis of said rod body.

7. A link connecting rod for a wiper apparatus comprising:

a tubular rod body having a ring-shaped cross section;

a flattened main plate portion flattened by compressing an end of said tubular rod body, and having a first plane portion, a second plane portion on the reverse side of said first plane portion and a retainer hole to be formed with a ball retainer through insert moulding;

a semicylindrical portion disposed in a position between said plate portion and said rod body, and having a hollow semicircular cross section and a third plane portion ranging with the second plane portion of said plate portion on the same plane;

a first brim portion formed by compressing one side of said semicylindrical portion, and having a fourth plane portion and a fifth plane portion ranging with the third plane portion of said semicylindrical portion on the same plane on the reverse side of said fourth plane portion, said first brim portion being disposed away from said main plate portion at a predetermined distance;

a second brim portion formed by compressing another side of said semicylindrical portion, and having a sixth plane portion and a seventh plane portion ranging with the third plane portion of said semicylindrical portion on the same plane on the reverse side of said sixth plane portion, said second brim portion being disposed away from said main plate portion at a predetermined distance;

an arched portion with a first and a second convex portion, the first convex portion being ranging between the first plane portion of said main plate portion and the fourth plane portion of said first brim portion and the second convex portion being ranging between said first plane portion of the main plate portion and the sixth plane portion of said second brim portion; and a ball retainer insert moulded on said main plate portion through the retainer hole of said main plate portion.

8. A link connecting rod as set forth in claim 7, wherein said third plane portion of the semicylindrical portion is formed with a concavity.

9. A link connecting rod as set forth in claim 7, wherein the center of said main plate portion is in agreement with the central axis of said rod body.

10. A link connecting rod as set forth in claim 8, wherein the center of said main plate portion is in agreement with the central axis of said rod body.

11. A link connecting rod for a wiper apparatus comprising:

a tubular rod body having a ring-shaped cross section;

a plate portion flattened by compressing an end of said tubular rod body, and having a first plane, a second plane on the reverse side of said first plane and a retainer hole to be formed with a ball retainer through insert moulding;

a semicylindrical portion disposed in a position between said plate portion and said rod body, and having a hollow semicircular cross section and a third plane ranging with the second plane of said plate portion on the same plane, said third plane being formed with a concavity;

a first brim portion formed by compressing one side of said semicylindrical portion, and having a fourth plane and a fifth plane ranging with the third plane of said semicylindrical portion on the same plane on the reverse side of said fourth plane; and a second brim portion formed by compressing another side of said semicylindrical portion, and having a sixth plane and a seventh plane ranging with the third plane of said semicylindrical portion on the same plane on the reverse side of said sixth plane.

12. A link connecting rod as set forth in claim 11, wherein the center of said plate portion is in agreement with the central axis of said rod body.

* * * * *